(12) United States Patent
Chang (10) Patent No.: US 8,506,183 B2
(45) Date of Patent: Aug. 13, 2013

(54) COMBINATION OF COVER WITH HOOD

(76) Inventor: Chung Jen Chang, Taichung (TW)

( * ) Notice: Subject to any disclaimer, the term of this patent is extended or adjusted under 35 U.S.C. 154(b) by 70 days.

(21) Appl. No.: 13/217,482

(22) Filed: Aug. 25, 2011

(65) Prior Publication Data

US 2013/0051784 A1 Feb. 28, 2013

(51) Int. Cl.
*G03B 17/00* (2006.01)
*G03B 11/04* (2006.01)

(52) U.S. Cl.
USPC .......................................... 396/448; 396/534

(58) Field of Classification Search
USPC .................. 396/534, 448; 359/611
See application file for complete search history.

(56) References Cited

U.S. PATENT DOCUMENTS

| | | | |
|---|---|---|---|
| 6,209,880 B1 * | 4/2001 | Turnwald et al. | 277/402 |
| 2005/0117900 A1 * | 6/2005 | Ohmori et al. | 396/448 |
| 2010/0200581 A1 * | 8/2010 | Maltz | 220/4.22 |

* cited by examiner

*Primary Examiner* — Clayton E Laballe
*Assistant Examiner* — Noam Reisner (57) ABSTRACT

Disclosed is a hood-cover combination for a lens of a camera. The hood-cover combination includes a hood, two covers and at least one button. The hood includes at least one canopy formed thereon. The covers are pivotally connected to the hood between an opening position and a closing position. The button is provided on the hood. The button is normally in a locking position for locking the covers in the opening position. The button is movable to a releasing position for allowing the pivoting of the cover to the opening position.

12 Claims, 11 Drawing Sheets

COMBINATION OF COVER WITH HOOD

BACKGROUND OF INVENTION

1. Field of Invention

The present invention relates to a camera and, more particularly, to a combination of two covers with a hood for a lens of a camera.

2. Related Prior Art

A camera includes a lens. The lens must be clean and integral so that clear photographs can be taken with the camera.

To retain the cleanness and integrity of the lens, a cover can be used to cover the lens of the camera equipped. Such a cover can be found in U.S. Pat. No. 7,775,671 for example. However, a photograph cannot be taken without removing the cover from the lens of the camera. This often causes a photographer to miss a good shot when he or she suddenly gets a fleeting glimpse of an object.

To overcome the foregoing problem, there have been devised automatic covering units for covering lenses. Such an automatic covering unit can be found in Japanese Patent Application Publication No. 2009-258600. The cover consists of two or three covers. Each of the covers is connected to a specific bent leaf spring in contact with a telescopic lens. When the telescopic lens is extended, the covers are pushed open by the telescopic lens through the bent leaf springs. When the telescopic lens is shrunk, the covers are closed by the telescopic lens through the bent leaf springs.

The camera is sometimes equipped with a hood for shielding the lens. Thus, the lens will not be wetted and contaminated by rain or splash of water. Moreover, clear photographs can be taken because undesirable light is blocked from the lens.

Conventionally, the cover and the hood are two different elements. The cover cannot be used to protect the lens if the hood is attached to the camera. It is troublesome to replace the hood with the lens camera, and vice versa.

The present invention is therefore intended to obviate or at least alleviate the problems encountered in prior art.

SUMMARY OF INVENTION

It is the primary objective of the present invention to provide a camera with a hood-cover combination.

To achieve the foregoing objective, the hood-cover combination includes a hood, two covers and at least one button. The hood includes at least one canopy formed thereon. The covers are pivotally connected to the hood between an opening position and a closing position. The button is provided on the hood. The button is normally in a locking position for locking the covers in the opening position. The button is movable to a releasing position for allowing the pivoting of the cover to the opening position.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Referring to FIGS. 1 through 10, there is shown a hood-cover combination in accordance with a first embodiment of the present invention. The hood-cover combination includes a hood 10, two covers 30 and 31, two connector assemblies 40 and two button assemblies 20.

Figure 1:
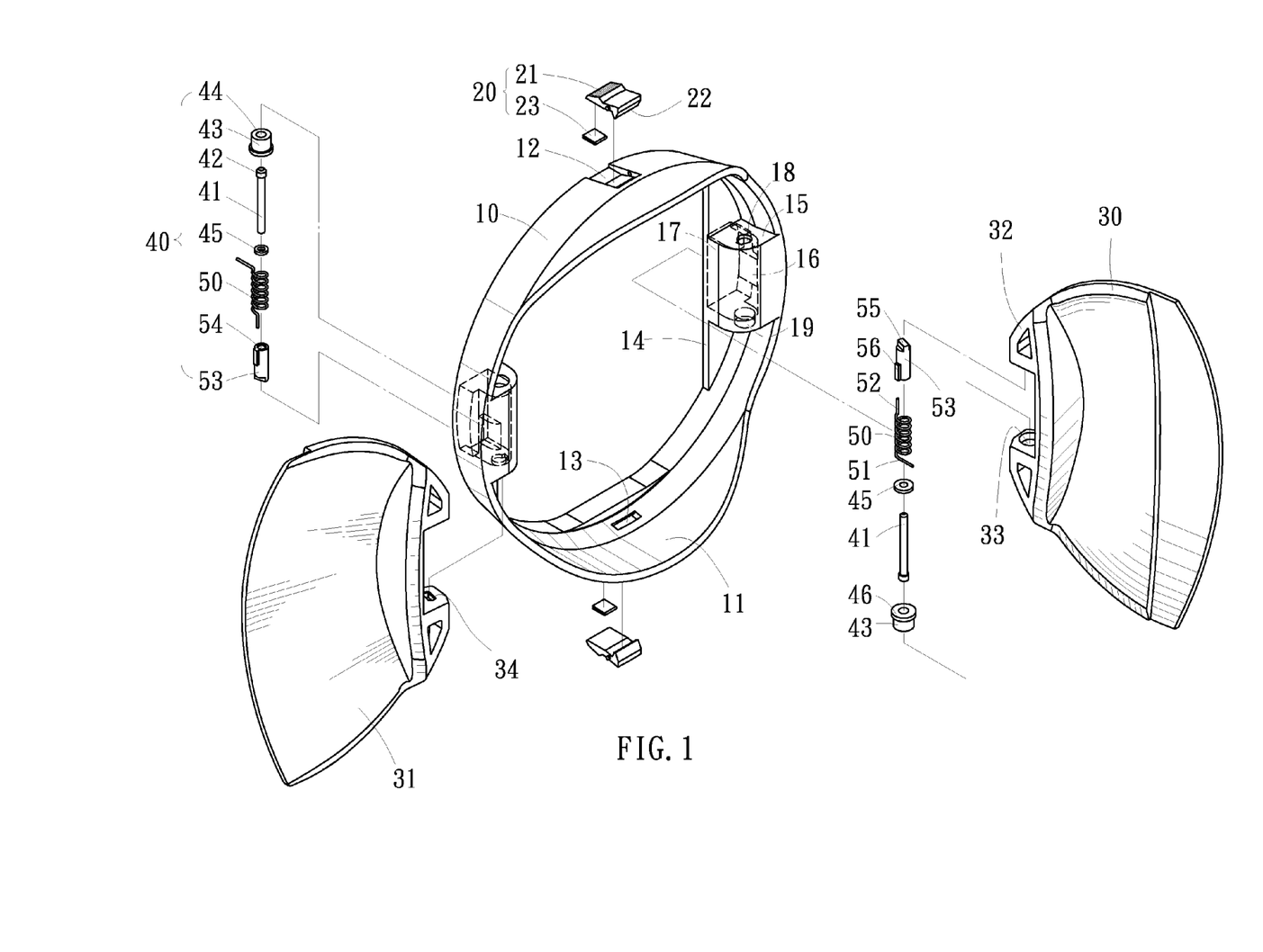
FIG. 1 is an exploded view of a hood-cover combination in accordance with the first embodiment of the present invention.

The hood 10 is an annular element with two opposite circular edges (or "ends"). The hood 10 includes two opposite canopies 11 extending from the first circular edge thereof, two opposite cavities 12 defined in an external side thereof, and two opposite slots 13 defined in an internal side thereof. Each of the cavities 12 is in communication with a related one of the slots 13. Each of the slots 13 is located in the vicinity of a related one of the canopies 11.

The hood 10 further includes two opposite crescent plates 14 extending on the internal side thereof and two opposite boxes 15 formed on a related one of the crescent plates 14. The boxes 15 are formed on the internal side of the hood 10. Each of the boxes 15 includes a space 16 defined therein, a slot 17 defined in a side thereof, a non-circular aperture 18 defined in an end thereof, and a circular aperture 19 defined in an opposite end thereof. The space 16 is in communication with the slot 17, the non-circular aperture 18 and the circular aperture 19. The non-circular aperture 18 is preferably a slot. It should be noted that the non-circular aperture 18 of one of the boxes 15 is defined in an upper end thereof while the non-circular aperture 18 of the other box 15 is defined in a lower end thereof.

Figure 7:
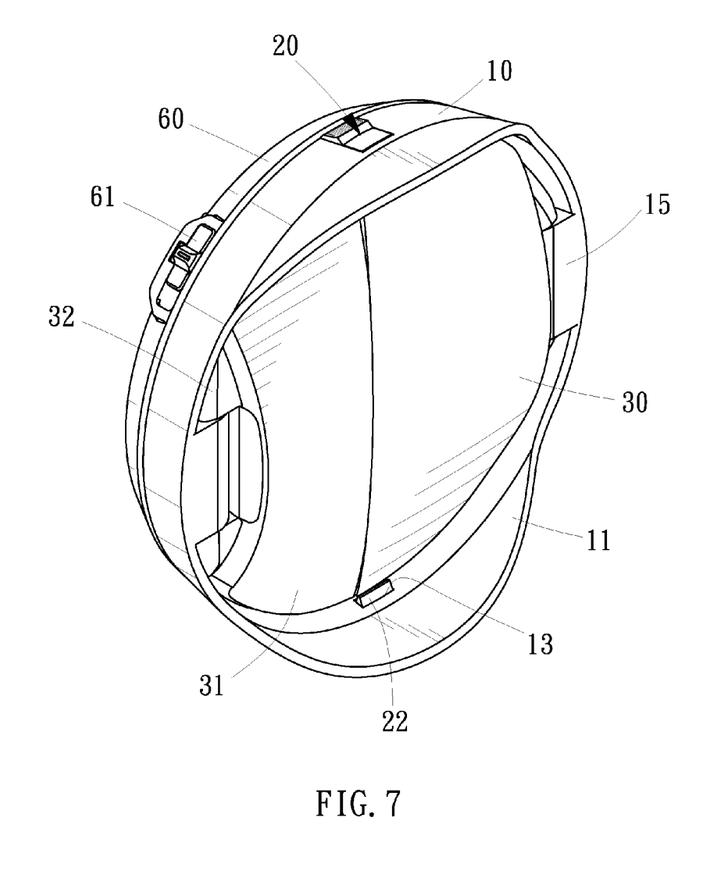
FIG. 7 is a perspective view of the lens-used frame engaged with the hood-cover combination shown in FIG. 6.

The first cover 30 includes two lugs 32 formed on an edge. One of the lugs 32 includes a circular bore 33 defined therein while the other lug 32 includes a non-circular bore 34 defined therein. The non-circular bore 34 is preferably a groove or slot. The first cover 30 includes a reduced lip formed on an opposite edge near an external side thereof. The second cover 31 is identical to the first cover 30 except including a reduced lip formed near an internal side thereof. Therefore, the lip of the first cover 30 is located over the lip of the second cover 31 when they are closed as shown in FIG. 7.

Figure 2:
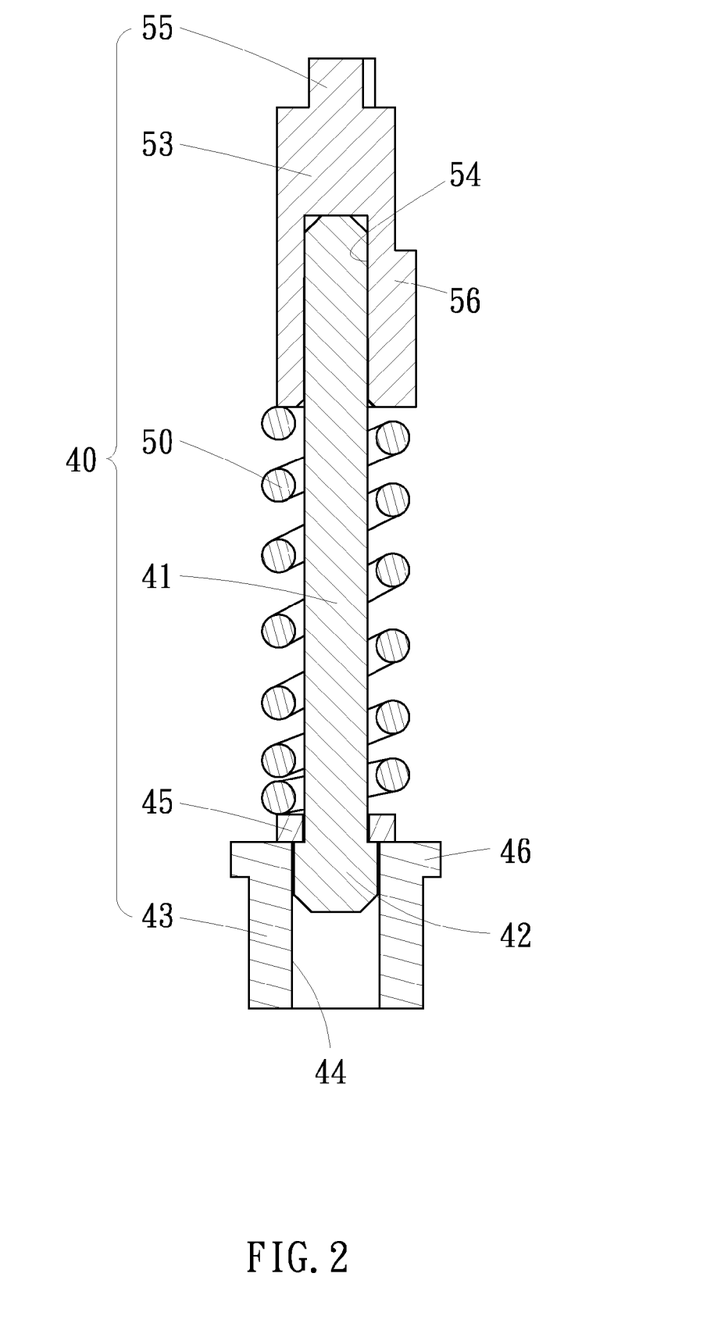
FIG. 2 is an enlarged, cross-sectional of a connector assembly used in the hood-cover combination shown in FIG. 1.

Referring to FIGS. 1 and 2, each of the connector units 40 includes an axle 41, a bushing 43, a washer 45, a helical spring 50 and a cap 53. The axle 41 is formed with an enlarged head 42.

The bushing 43 includes an aperture 44 axially defined therein and an annular rib 46 formed thereon. The annular rib 46 is located near an end of the bushing 43.

The helical spring 50 extends around an axis. The helical spring 50 is formed with two ends 51 and 52. The first end 51 of the helical spring 50 extends perpendicular to the axis around which the helical spring 50 extends. The second end 52 of the helical spring 50 extends parallel to the axis around which the helical spring 50 extends.

The cap 53 includes a bore 54 axially defined in an end thereof, a flat tip 55 formed at an opposite end thereof, and a rectilinear rib 56 formed thereon. The diameter of the bore 54 is marginally smaller than the diameter of the axle 41 for a reason to be given.

The enlarged head 42 of the axle 41 is located in the aperture 44 of the bushing 43. The washer 45 and the helical spring 50 are provided around the axle 41. The other end of the axle 41 is fit in the bore 54 of the cap 53. The second end 52 of the helical spring 50 is located against the rectilinear rib 56 of the cap 53.

Figure 3:
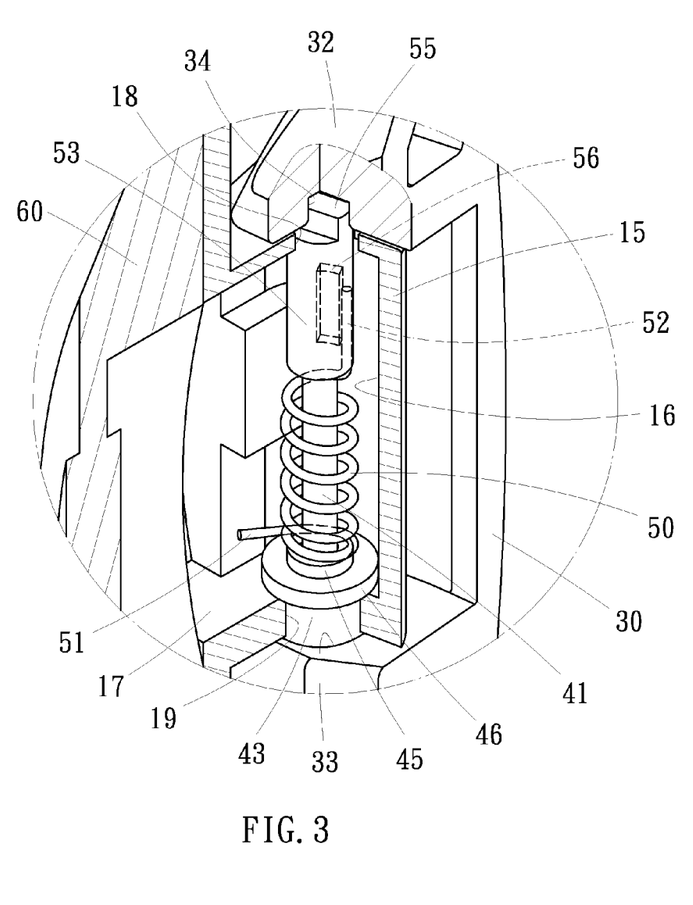
FIG. 3 is an enlarged, partial, cut-away view of the hood-cover combination shown in FIG. 1.
Figure 4:
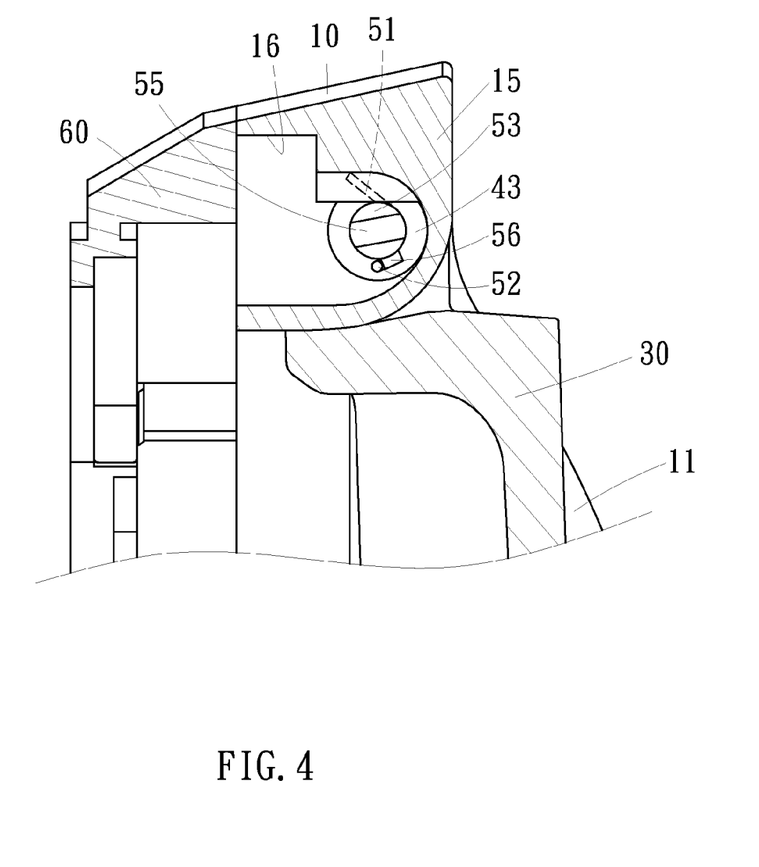
FIG. 4 is an enlarged, partial, cross-sectional view of the hood-cover combination shown in FIG. 2.
Figure 5:
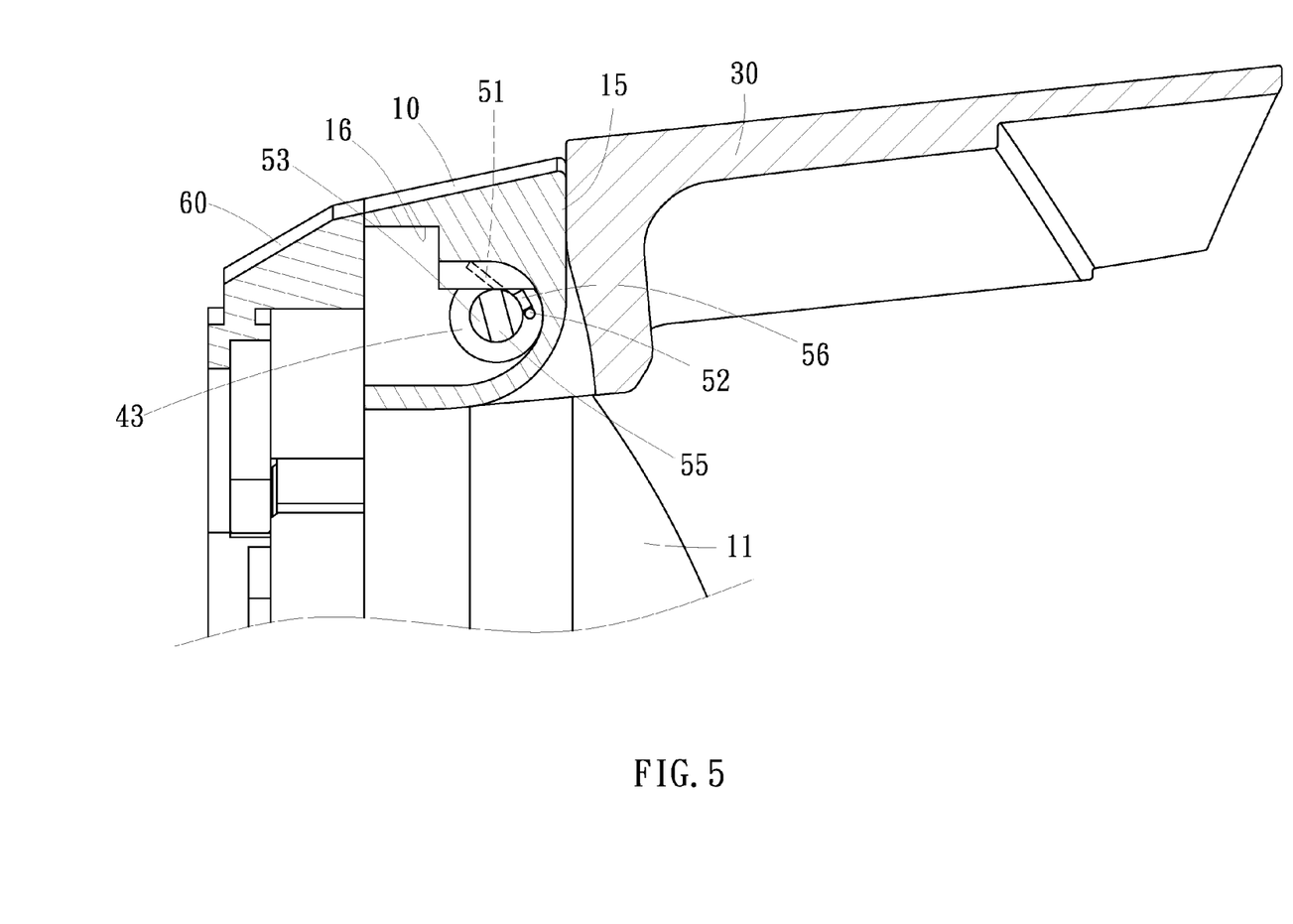
FIG. 5 is an enlarged, partial, cross-sectional view of the hood-cover combination in another position than shown in FIG. 4.

Referring to FIGS. 3 to 5, the assembly of the hood-cover combination except the button assemblies 20 will be described. For the briefness of the specification, only the connection of the first cover 30 to a related one of the boxes 15 via a related one of the connector assemblies 40 will be described in detail. It should however be noted that the connection of the second cover 31 to the other box 15 through the other connector assembly 40 is the same.

The connector 40 is moved in the box 15 via the slot 17. The bushing 43 is inserted in the circular bore 33 of the first cover 30 through the circular aperture 19 of the box 15. The flat tip 55 of the cap 53 is inserted in the non-circular bore 34 of the first cover 30 through the circular aperture 18 of the box 15. Thus, the first cover 30 is pivotally connected to the box 15 through the connector assembly 40. The first end 51 of the helical spring 50 is located against a portion of the box 15 while the second end of the helical spring 50 is located against the rectilinear rib 56. Thus, the helical spring 50 tends to turn the first cover 30 from the hood 10, i.e., open the hood 10.

Referring to FIG. 1, each of the button assemblies 20 includes a seesaw-type button 21 and a bent leaf spring 23. The button 21 includes a barb 22 formed at an end. The button 21 is pivotally connected to the hood 10 within a related one of the cavities 12 while the hook 22 thereof is inserted through a related one of the slots 13. The button 21 can be pivoted between a locking position and a releasing position. The bent leaf spring 23 is provided between the button 21 and the hood 10. The bent leaf spring 23 tends to pivot the button 21 to the locking position.

Figure 6:
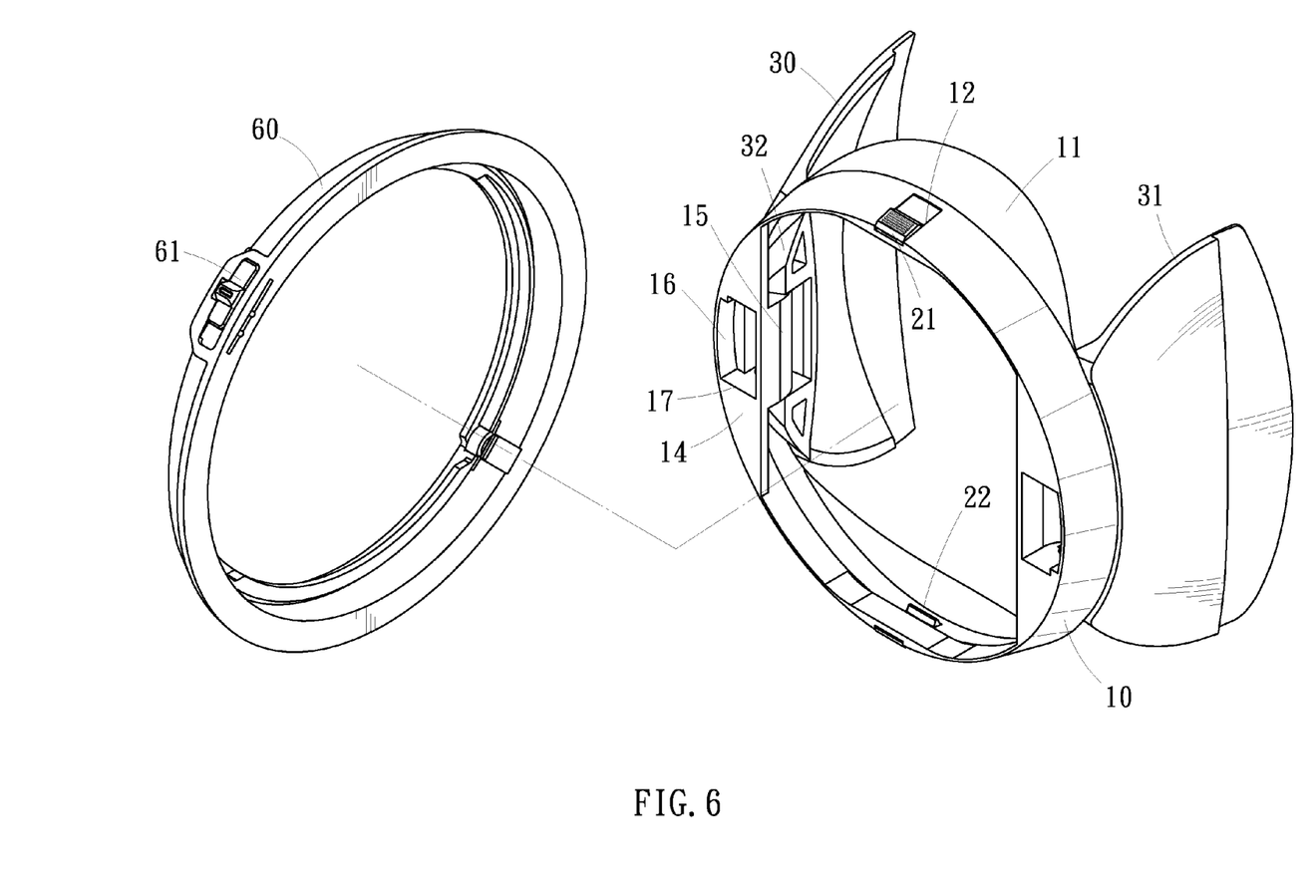
FIG. 6 is a perspective view of a lens-used frame separated from a video camera and the hood-cover combination shown in FIG. 1.
Figure 8:
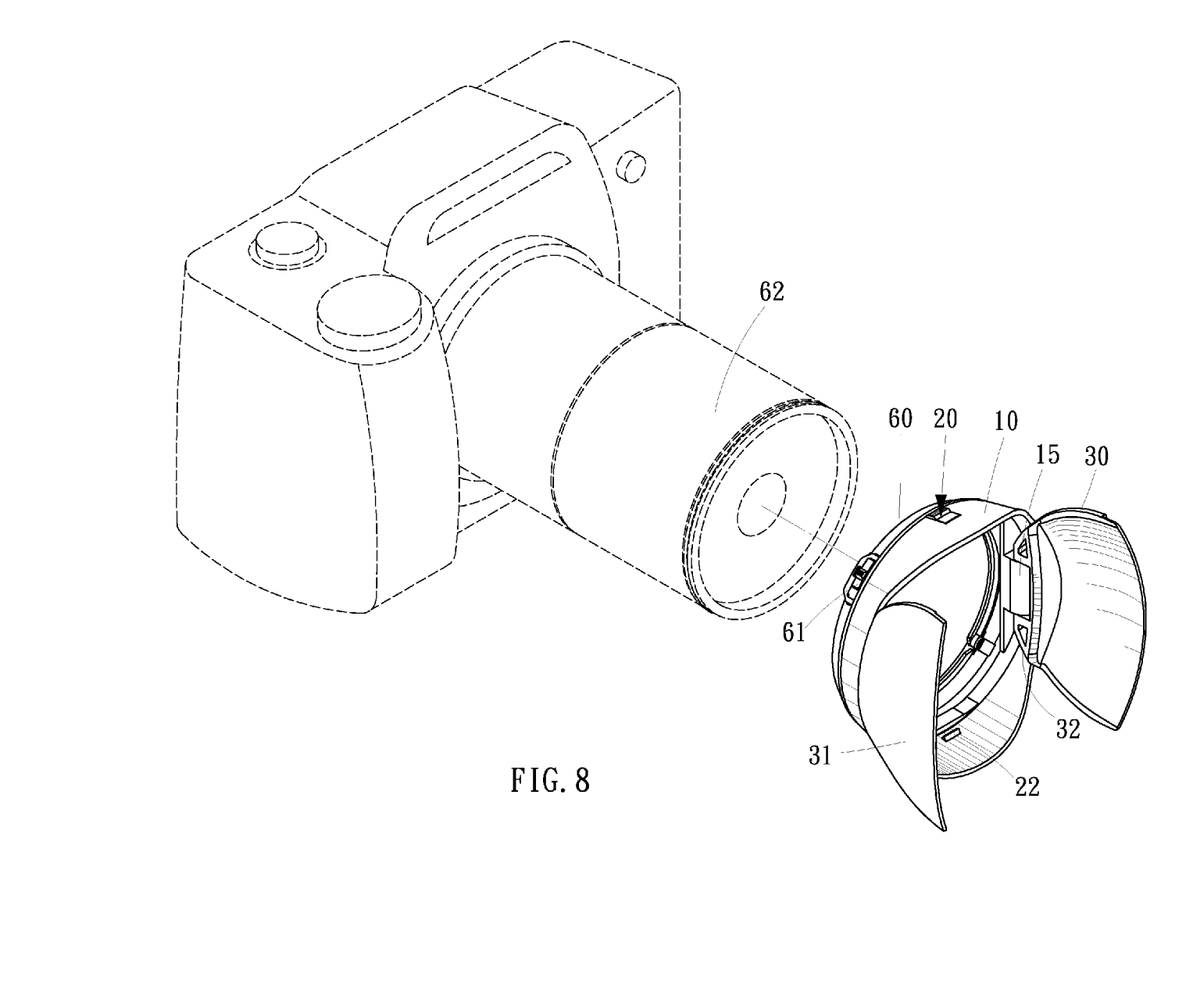
FIG. 8 is a perspective view of a camera, the lens-used frame and the hood-cover combination shown in FIG. 6.
Figure 9:
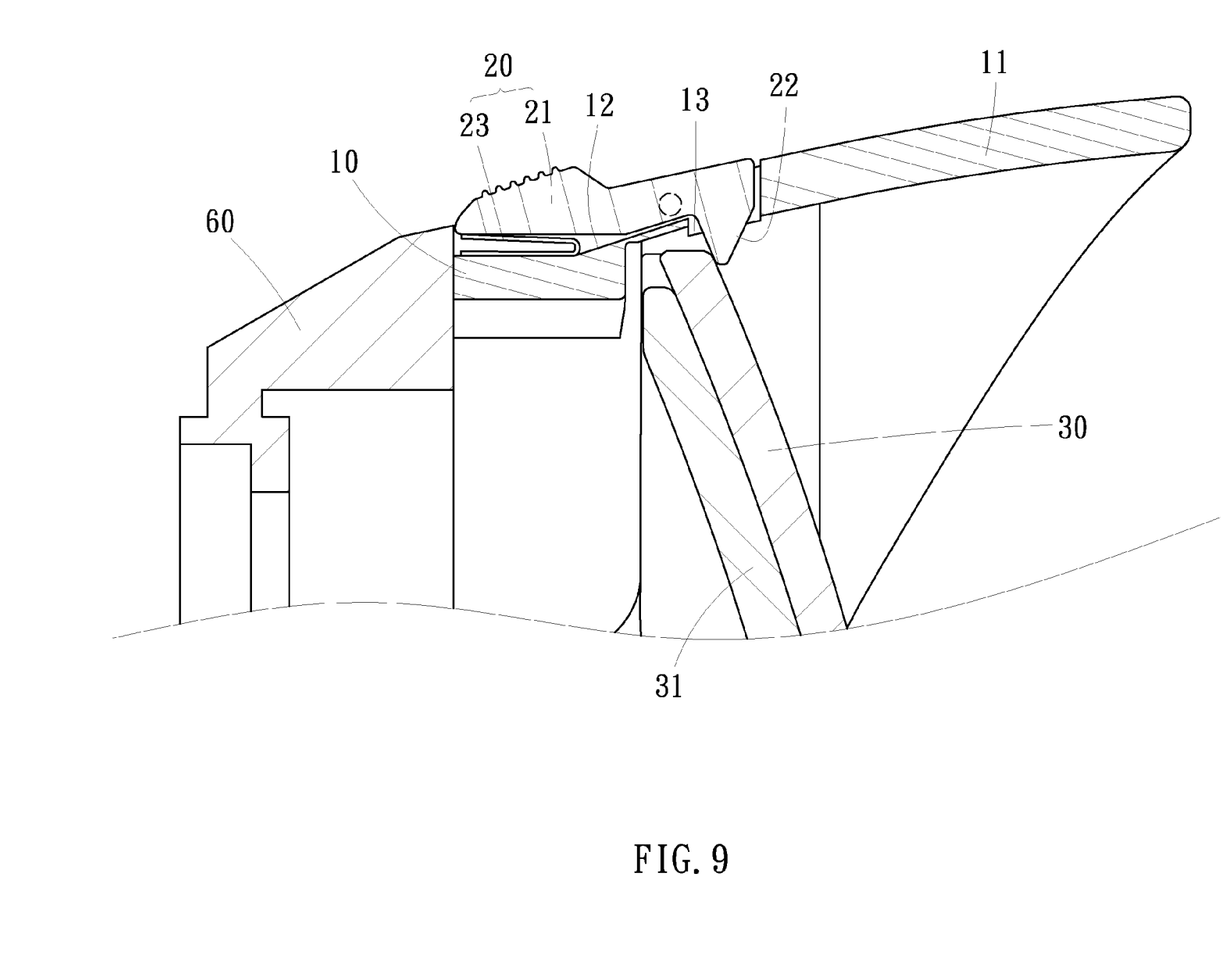
FIG. 9 is an enlarged, partial, cross-sectional view of a button of the hood-cover combination shown in FIG. 6.
Figure 10:
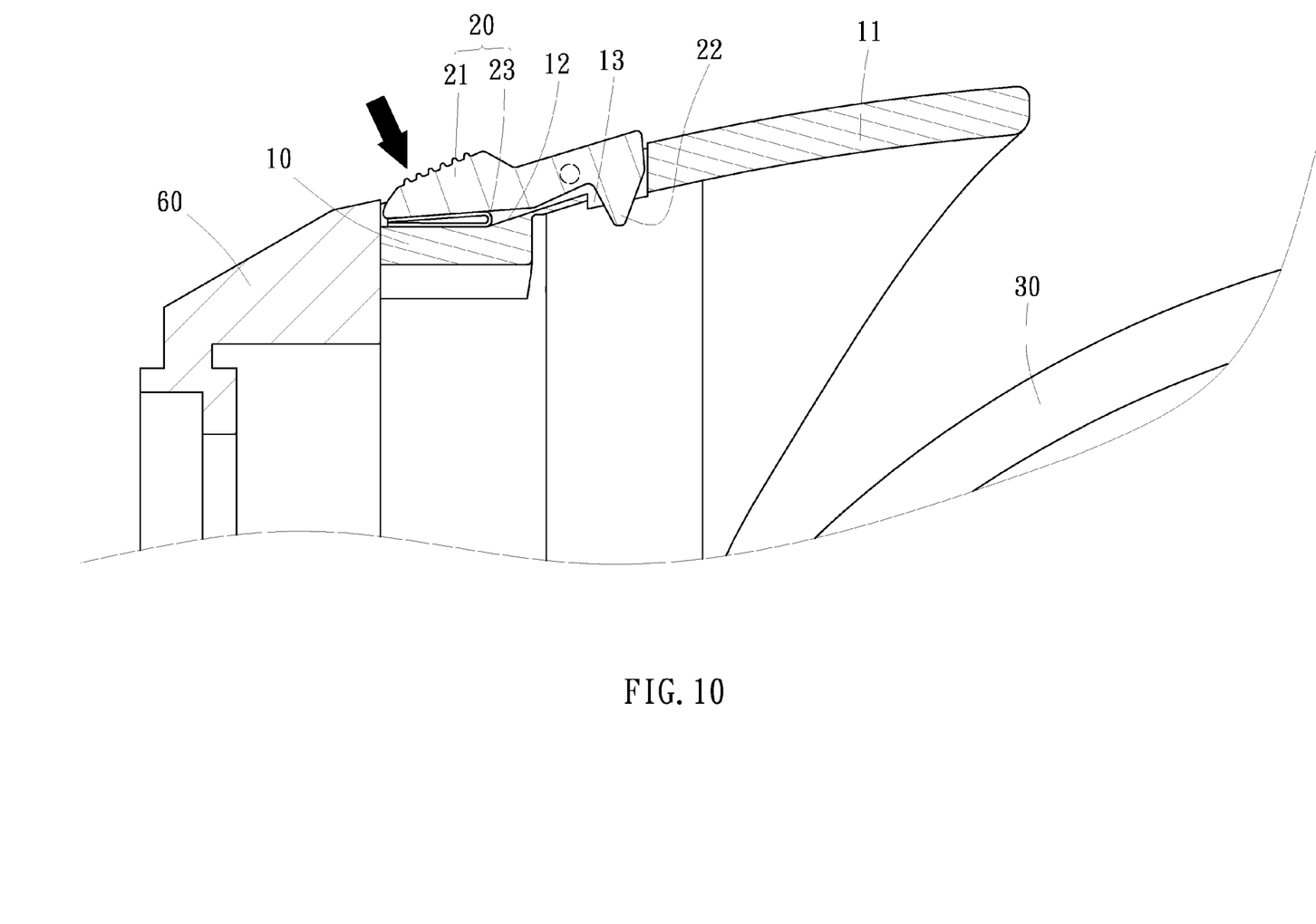
FIG. 10 is an enlarged, partial, cross-sectional view of the button of the hood-cover combination in another position than shown in FIG. 9.

Referring to FIGS. 6 to 8, the hood-cover combination further includes a ring 60 secured to the second annular edge of the hood 10 by the high frequency technology for example. A switch 61 is movably provided on the ring 60 between a locking position and a releasing position. Normally, the switch 61 is in the locking position. The ring 60 can be attached to a frame of a lens 62 of a camera. By moving the switch 61 to the releasing from the locking position, the ring 60 can be detached from the frame of the lens 62.

Referring to FIG. 6, the helical spring 50 tends to turn the first cover 30 from the hood 10, i.e., open the hood 10. Thus, the camera can be used to take photographs.

Referring to FIG. 7, the lip of the first cover 30 is located over the lip of the second cover 31 and hooked by the barbs 22 of the buttons 21 kept in the locking position by the bent leaf springs 23. That is, the hood 10 is opened. Thus, the lens 62 of the camera is covered and hence protected by the hood-cover combination.

By pivoting the buttons 21 to the releasing position from the locking position, the barbs 22 of the buttons 21 are removed from first cover 30 and hence the second cover 31. Therefore, the helical springs 50 snap open the covers 30 and 31.

Figure 11:
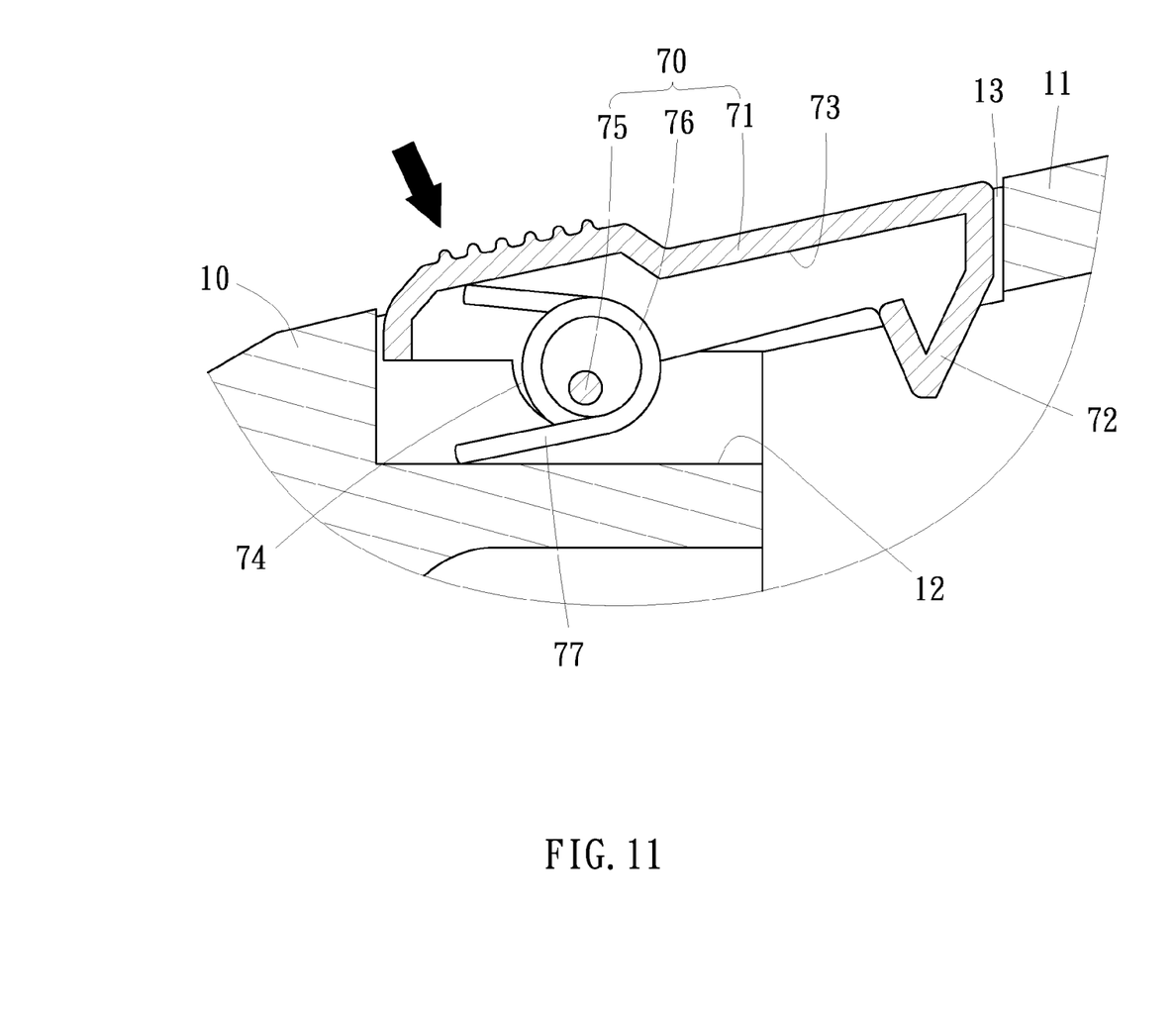
FIG. 11 is an enlarged, partial, cross-sectional view of a hood-cover combination in accordance with the second embodiment of the present invention.

Referring to FIG. 11, there is shown a hood-cover combination in accordance with a second embodiment of the present invention. The second embodiment is like the first embodiment except including two button assemblies 70 instead of the button assemblies 20. Each of the button assemblies 70 includes a button 71, a pin 75 and a helical spring 76. The button 71 includes a barb 72 formed at an end, two lugs 74 formed thereon, and a space 73 defined between the lugs 74. The helical spring 76 is formed with two ends 77. The pin 75 is inserted through the helical spring 76 and driven in two portions of the hood 10 near a related one of the cavities 12. One of the ends 77 is located against an opposite end of the button 71 and the other end 77 of the helical spring 76 is located against the hood 10 in the related cavity 12.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A hood-cover combination including:
   a hood including at least one canopy formed thereon;
   two covers pivotally connected to the hood between an opening position and a closing position and each formed with two lugs, wherein one of the lugs includes a non-circular bore defined therein;
   at least one button provided on the hood, wherein the button is normally in a locking position for locking the covers in the opening position and movable to a releasing position for allowing the pivoting of the covers to the opening position; and
   two connector assemblies each including:
      an axle inserted in the lugs of a corresponding one of the covers via the hood;
      a helical spring provided around the axle and formed with an end located against a corresponding one of the covers and another end located against the hood so that the helical spring tends to pivot a corresponding one of the covers to the opening position from the closing position; and
      a cap fit on an end of the axle and formed with a flat tip inserted in the non-circular bore and a rib located against one of the ends of the helical spring.

2. The hood-cover combination in accordance with claim 1, further including a ring secured to the hood at an end and attachable to a frame of a lens of a camera at another end.

3. The hood-cover combination in accordance with claim 1, wherein the axle includes an enlarged head formed at an opposite end, wherein the helical spring is located between the cap and the enlarged head of the axle.

4. The hood-cover combination in accordance with claim 3, wherein each of the connector assemblies further includes a washer provided on the axle and sandwiched between the enlarged head of the axle and the helical spring.

5. The hood-cover combination in accordance with claim 1, wherein the other lug includes a circular bore defined therein, wherein each of the connector assemblies further includes a bushing inserted in the circular bore, wherein the axle is inserted in the bushing.

6. The hood-cover combination in accordance with claim 1, wherein the button includes a barb for hooking the covers.

7. The hood-cover combination in accordance with claim 1, further including a spring for biasing the button to the locking position.

8. The hood-cover combination in accordance with claim 7, wherein the spring is a bent leaf spring.

9. The hood-cover combination in accordance with claim 7, wherein the spring is a helical spring.

10. The hood-cover combination in accordance with claim 9, further including a pin inserted in the hood through the helical spring.

11. The hood-cover combination in accordance with claim 10, wherein the button includes two lugs formed thereon, wherein the pin is inserted through the lugs.

12. The hood-cover combination in accordance with claim 11, wherein the helical spring is located between the lugs.

\* \* \* \* \*